United States Patent [19]
Lebrun et al.

[11] Patent Number: 4,689,252
[45] Date of Patent: Aug. 25, 1987

[54] POLYSILAZANE COMPOSITION WHICH CAN CROSSLINK IN THE PRESENCE OF A METAL COMPOUND CATALYZING A HYDROSILYLATION REACTION

[75] Inventors: Jean-Jacques Lebrun, Caluire; Huques Porte, Lyons, both of France

[73] Assignee: Rhone-Poulenc Specialites Chimiques, Courbevoie, France

[21] Appl. No.: 845,190

[22] Filed: Mar. 28, 1986

[30] Foreign Application Priority Data

Mar. 29, 1985 [FR] France ................................ 85 04759

[51] Int. Cl.$^4$ ............................................. B32B 17/02
[52] U.S. Cl. .................................... 427/228; 428/446; 428/698; 528/15; 528/21; 528/38; 501/88; 501/92; 423/344; 423/345; 524/404; 524/408; 524/413; 524/437; 524/588; 524/858; 524/869
[58] Field of Search ............................. 528/21, 15, 38; 427/228; 428/446, 698; 501/88, 92; 423/344, 345; 524/404, 437, 408, 413, 588, 858, 869

[56] References Cited

U.S. PATENT DOCUMENTS

| | | | |
|---|---|---|---|
| 2,564,674 | 8/1951 | Cheronis | 260/448.2 |
| 3,159,601 | 12/1964 | Ashby | 260/46.5 |
| 3,159,662 | 12/1964 | Ashby | 260/448.2 |
| 3,220,972 | 11/1965 | Lamoreaux | 260/46.5 |
| 3,296,291 | 1/1967 | Chalk et al. | 260/448.2 |
| 3,715,334 | 2/1973 | Karstedt | 260/46.5 |
| 3,775,452 | 11/1973 | Karstedt | 260/429 |
| 3,814,730 | 6/1974 | Karstedt | 260/46.5 |
| 3,853,567 | 12/1974 | Verbeek | 106/44 |
| 3,892,583 | 7/1975 | Winter et al. | 106/55 |
| 3,928,629 | 12/1975 | Chandra et al. | 427/387 |
| 4,395,460 | 7/1983 | Gaul | 501/88 |
| 4,397,828 | 8/1983 | Seyferth et al. | 423/344 |
| 4,404,153 | 9/1983 | Gaul, Jr. | 264/29.2 |

OTHER PUBLICATIONS

Chemical Abstracts, vol. 83, No. 12, Sep. 22, 1975, p. 16, Ref. No. 98177z, Columbus, Ohio, U.S.; and SU-A-472,952 (Lomonosov, M. V., Institute of Fine Chemical Technology, Moscow) 05-06-1975.
Polymer Science U.S.S.R., vol. 21, No. 4, Jan. 1980, pp. 996–1003, Pergamon Press Ltd., PL; K. A. Andrianov et al.: "Study of the Polyaddition Reaction of 1,3-bis-(-Dimethylsilyl) Tetramethylcyclodisilazane to Unsaturated Compounds".

*Primary Examiner*—Melvyn I. Marquis
*Attorney, Agent, or Firm*—Finnegan, Henderson, Farabow, Garrett & Dunner

[57] ABSTRACT

A crosslinkable composition comprising at least one polysilazane containing at least 2, preferably at least 3, $\equiv$SiH groups per molecule and at least 2 SiR$_2$ groups per molecule, R$_2$ being an unsaturated hydrocarbon radical and a catalytically effective quantity of a metal element or of a metal compound to catalyze the hydrosilylation reaction SiH/SiR$_2$.

The compositions according to the invention can crosslink under the effect of heat and can be used for coating or impregnating substrates with ceramic material after pyrolysis. The mechanical properties of the crosslinked compositions are assessed by evaluating the relative rigidity RR measured by the fiber torsion pendulum method (FIG. 1).

32 Claims, 2 Drawing Figures

POLYSILAZANE COMPOSITION WHICH CAN CROSSLINK IN THE PRESENCE OF A METAL COMPOUND CATALYZING A HYDROSILYLATION REACTION

The present invention relates to a polysilazane composition which can crosslink by a hydrosilylation reaction in the presence of a metal element or a metal compound catalysing a hydrosilylation reaction.

Organopolysilazanes, referred to thereinafter as polysilazanes, are well-known products in the form of monomers, oligomers, ring or linear polymers and resinous polymers. A wide variety of methods and starting materials can be used to prepare polysilazanes. Polysilazanes, for instance, can be shaped and can be pyrolysed in the form of $Si_3N_4$, SiC or their mixtures. Another route for the manufacture of silicon nitride involves reacting chlorosilanes ($SiCl_4$, $HSiCl_3$ and $H_2SiCl_2$) with ammonia at a high temperature and in vapor phase, but it is difficult to manufacture shaped articles, especially fibers, using this method, since the method yields a powdered product. Alternatively, polysilazanes can be spun into continuous filaments whose pyrolysis yields ceramic fibers. Polysilazanes can also be shaped into films of various gauges, into massive molded articles, and can also be used as a binder for ceramic fiber or carbon fiber and as a sintering binder for porous ceramic articles.

Difficulties are encountered, however, in converting these polysilazanes readily and economically into the form of fibers or coatings which, after pyrolysis, yield ceramic products in the form of fibers, films, coatings of various gauges and moulded articles.

An attempt to provide a solution to the above problem was made in the U.S. Pat. No. 3,853,567. This patent describes a process for the manufacture of shaped articles such as fibers comprising silicon carbide, silicon nitride or mixtures thereof with other ceramic products, by pyrolyzing a polysilazane at a temperature between 200° C. and 800° C. to obtain a meltable carbosilazane resin which can be melt-spun and then pyrolyzing the resin at a temperature between 800° and 2,000° C. in an inert atmosphere to convert the carbosilazane to silicon carbide and silicon nitride.

The process disclosed in U.S. Pat. No. 3,853,567 represents a significant step forward but it has the disadvantages of requiring a first thermal treatment at a temperature which can be very high (200°-800° C.) and of working with a carbosilazane in melt form under anhydrous conditions in an inert atmosphere. In addition, the weight yield of ceramic product relative to the weight of polysilazane can be inadequate.

The object of the present invention is to solve the above problems with a simple, effective, economical and readily usable method for converting polysilazanes which, when pyrolyzed at a temperature between 1,000° and 2,000° C., yield ceramic products having excellent properties and which may be shaped into a wide variety of forms (filaments, moulded articles, coatings, films, and the like).

Another objective of the present invention is to provide a polysilazane which is sufficiently stable to hydrolysis and which yields a ceramic material in a high weight yield when pyrolyzed. To achieve this objective, the polysilazane must show good thermal behavior during the pyrolysis and remain integrally attached to the substrate being coated and impregnated.

DESCRIPTION OF THE DRAWINGS

FIG. 2 is a graph of the relative rigidity RR of fibers described in Example 16 and Comparative Example 16a.

Figure 1:
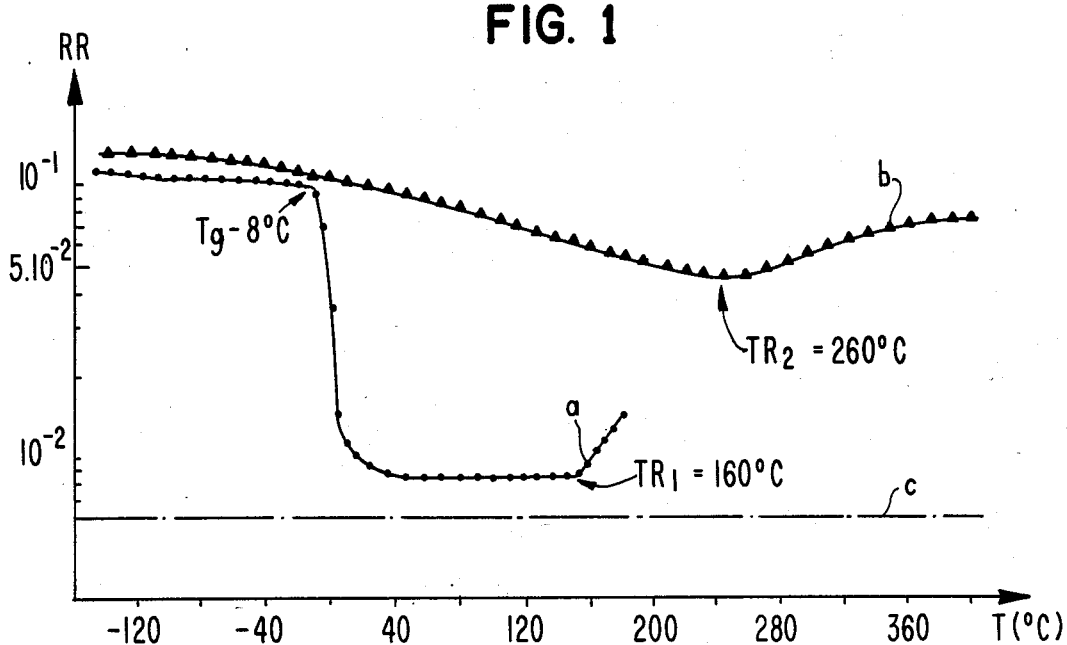
FIG. 1 is a graph of the relative rigidity RR of fibers described in Example 15.

The present invention relates to a polysilazane composition which can crosslink at ambient temperature or under the effects of heat or irradiation. The polysilazane composition of the present invention comprises at least one polysilazane (1) containing at least 2, preferably at least 3 ≡SiH groups per molecule, and at least 2 $SiR_2$ groups per molecule, wherein $R_2$ is an unsaturated hydrocarbon radical, and a catalytically effective quantity of a metal element or of a metal compound to catalyze the hydrosilylation reaction ≡SiH/≡$SiR_2$.

The polysilazane composition of the present invention preferably comprises at least one polysilazane (1) having, per molecule, at least 2, preferably at least 3 moieties (chosen from the moieties of formula (Ia), (Ib) and (Ic)):

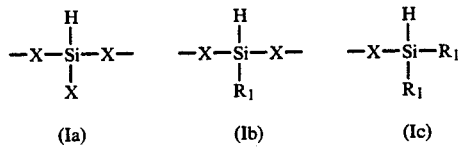

in which $R_1$, which in (Ic) may be identical or different, is selected from the group consisting of hydrogen, a saturated hydrocarbon, aryl, alkylaryl and arylalkyl;

at least 2 moieties selected from the moieties of formula (IIa), (IIb) and (IIc):

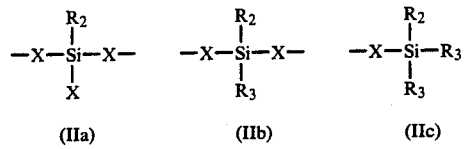

in which $R_2$ denotes a hydrocarbon containing alkene or alkyne unsaturation, $R_3$, which in (IIc) may be identical or different, is selected from the group consisting of saturated hydrocarbon, aryl, alkylaryl and arylalkyl, or $R_3$ may be a hydrocarbon containing alkene or alkyne unsaturation, but $R_3$ is not a hydrogen atom, and the symbol X in formulae (Ia), (Ib), (Ic), (IIa), (IIb) and (IIc), which may be identical or different in formulae (Ia), (Ib), (IIa) and (IIb), denotes the chain links $(CH_2)_n$ (n being an integer from 1 to 8), —Si— or N—, with at least 50% of the Xs being N—; and a catalytically effective quantity of a metal element or a metal compound to catalyze a hydrosilylation reaction.

According to a preferred embodiment of the invention, it is possible to use, instead of or in addition to the polysilazane (1) alone, a mixture of polysilazane comprising at least one polysilazane (2) containing, per molecule, at least 2 (preferably at least 3) moieties chosen from the moieties of formula (Ia), (Ib) and (Ic) above; and at least one polysilazane (3) containing, per molecule, at least 2 moieties chosen from the moieties of formula (IIa), (IIb) and (IIc) above.

In the polysilazanes (1), (2) and (3), the moieties other than (Ia), (Ib), (Ic) or (IIa), (IIb), (IIc) can be selected from the moieties of formulae:

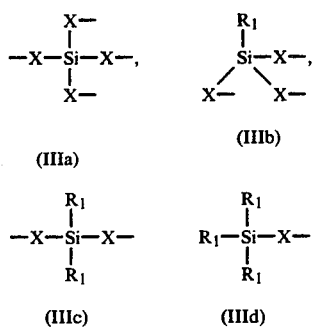

(IIIa)  (IIIb)  (IIIc)  (IIId)

in which $R_1$ and chain links X, which may be identical or different in the formulae containing more than one $R_1$ or containing more than one X, have the meanings given above.

In the formulae (Ib) and (Ic), (IIIb), (IIIc) and (IIId), the radical $R_1$ can be selected from the group consisting of (a) saturated aliphatic hydrocarbons, preferably containing from 1 to 8 carbon atoms, such as a methyl, ethyl, propyl, butyl, pentyl, hexyl, heptyl, and octyl; (b) saturated cyclic hydrocarbon radicals containing from 3 to 7 carbon atoms, such as cyclopropyl, cyclobutyl, cyclopentyl, cyclohexyl and cycloheptyl (c) aryl, such as phenyl, (d) arylalkyl, such as benzyl and phenylethyl, and (e) alkylaryl, such as tolyl and xylyl. The methyl and phenyl radicals are the preferred radicals for $R_1$.

In the formula (IIa), (IIb) and (IIc), the radical $R_2$ can be selected from the group consisting of aliphatically unsaturated radicals, preferably containing from 2 to 8 carbon atoms, such as ethynyl, propynyl and the like, vinyl, allyl and the like, and cycloalkenyl, such as cyclopentenyl, cyclohexenyl, cycloheptenyl and cyclooctenyl. Vinyl is preferred.

The examples given for $R_1$ and $R_2$ can also be mentioned as examples of $R_3$. In the formula (IIb) and (IIc), $R_3$ may be the same as $R_1$ or $R_2$ with the condition that $R_3$ is not hydrogen.

X is preferably chosen from N— and —Si—.

The polysilazanes (1), (2) and (3) above are well-known products described in detail in the literature. They can be obtained as a reaction product of an organohalomonosilane of formula:

$$R_aY_{4-a}Si$$

in which Y is a halogen, preferably chlorine, and the radical(s) R, identical or different, can have the definition of $R_1$, $R_2$ or $R_3$ above, with an organic or organosilicon compound containing at least one $NH_2$ or NH group such as, for example, ammonia, primary or secondary amines, silylamines, amides, hydrazines, hydrazides, and the like.

As an organohalosilane which can be used on its own or in a mixture, there can be mentioned:
$(CH_3)_2SiCl_2$, $(CH_3)_3SiCl$, $CH_3SiCl_3$, $SiCl_4$
$(CH_3)_2Si(CH_2Cl)_2$, $(CH_3)_3SiCH_2Cl$, $CH_3Si(CH_2Cl)_3$
$(C_6H_5)_2SiCl_2$, $(C_6H_5)(CH_3)SiCl_2$, $C_6H_5SiCl_3$ (
$CH_3)(CH_3CH_2)SiCl_2$
$CH_3HSiCl_2$, $H_2SiCl_2$, $(CH_3)_2HSiCl$, $HSiCl_3$
$CH_3(CH_2=CH)SiCl_2$, $(CH_3)_2(CH_2=CH)SiCl$.

Examples of compounds containing at least one $NH_2$ and NH group which can be used for the synthesis of the above polysilazanes are: ammonia, methylamine, dimethylamine, ethylamine, cyclopropylamine, hydrazine, methylhydrazine, ethylenediamine, tetramethylenediamine, hexamethylenediamine, aniline, methylaniline, diphenylamine, toluidine, guanidine, aminoguanidine, urea, hexamethyldisilazane, diphenyl tetramethyldisilazane, tetraphenyldimethyldisilazine, tetramethyldivinyldisilazane, dimethyldiphenyldivinyldisilazane and tetramethyldisilazane.

The polysilazanes which can be used within the scope of the present invention also include the organopoly(-disilyl)silazanes which can be prepared by the reaction (a) of an organic or organosilicon compound containing at least one $NH_2$ or NH group such as, for example, ammonia, primary or secondary amines, silylamines, amides, hydrazines and hydrazides, and the like, with (b) at least one organohalodisilane of formula:

$$R_bX_{3-b}SiSiR_cX_{3-c} \qquad (V)$$

in which the radicals R, identical or different, have the same meaning as above, b is equal to 0, 1, 2 or 3, c is equal to 0, 1 or 2 and X is a halogen, generally chlorine.

Examples of compounds of formula (V) include:
$(CH_3)_2ClSiSi(CH_3)_2Cl$, $(CH_3)_2ClSiSiCH_3Cl_2$
$CH_3Cl_2SiSiCH_3Cl_2$ The same compounds as those mentioned above in the case of the aminolysis of organohalomonosilanes are examples of compounds containing at least one $NH_2$ or NH group which can be used for the synthesis of the above poly(disilyl)silazanes.

The polysilazanes (1), (2) and (3) are well-known and easy to prepare. Specifically, they include linear polymers corresponding to the formulae:

$$H_2N(R_2SiNH)_pSiR_2NH_2 \qquad (a)$$

and $$R_3SiNH(R_2SiNH)_{p'}SiR_3 \qquad (b)$$

in which R has the meaning of $R_1$, of $R_2$ or $R_3$ above; p and p' are integers which can be from 1 to 1,000, generally from 3 to 30.

The polymers of formula (a) can be prepared by placing diorganodichlorosilanes in contact with ammonia, and those of formula (b) by the reaction of ammonia with a triorganochlorosilane or a mixture of diorganodichlorosilane and triorganochlorosilane (see BF A. 1,086,932, U.S. Pat. No. 2,564,674).

In general, the reaction of an organohalosilane with an organic amine is described in U.S. Pat. Nos. 3,853,567 and 3,892,583, and the reaction of an organohalosilane with a disilazane is described in Belgian Pat. No. BE-A 888,787. The disclosures of U.S. Pat. Nos. 2,564,674, 3,853,567 and 3,892,583 are incorporated herein by reference.

The polysilazanes (1), (2) and (3) also include ring polymers corresponding to the formula:

$$(R_2SiNH)_n$$

in which
n is from 3 to 10, generally n=3.4 and R has the meaning given above, which are described in British Pat. GB-A No. 881,178; and the resinous polymers consisting of moieties chosen from those of formula $R_3SiNH_{0.5}$, $R_2SiNH$, $RSiNH_{1.5}$ and $Si(NH)_2$, wherein R has the meaning given above, which are advantageously prepared by contacting the corresponding organochlorosilanes or mixtures of these silanes, with ammonia, optionally in an organic solvent medium (see French Pat. Nos. FR-A 1,379,243, 1,392,853 and 1,393,728).

These resinous polysilazanes contain a predominant number of Si—NH—Si bonds and a smaller number of Si—NH$_2$ or N(Si—)$_3$ bonds and occasionally comprise, in addition to the crosslinked polymers, linear or ring polymers; the latter being capable of formation only when diorganodichlorosilanes are chiefly present among the starting organochlorosilanes.

The starting polysilazanes prepared from ammonia are generally referred to as ammonolysates and the starting polysilazanes prepared from an amino compound as indicated above are referred to as aminolysates, which thus include the ammonolysates.

More particularly, the polysilazanes (1) containing moieties of both formula (Ib) and (IIb) can be formed by coammonolysis of the following silanes:

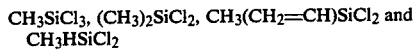
$CH_3SiCl_3$, $(CH_3)_2SiCl_2$, $CH_3(CH_2=CH)SiCl_2$ and $CH_3HSiCl_2$ As a polysilazane (2) containing moieties of formula (Ib) and in which $R_1=H$ there can be used the cyclic or linear polysilazanes of formula:

—$(H_2SiNH)_n$— whose preparation is described in detail in U.S. Pat. No. 4,397,828, the disclosure of which is incorporated herein by reference.

As a cyclic or linear polysilazane (2) containing moieties of formula (Ib), in which $R_1$ is not a hydrogen, there can be used polysilazanes of formula:

—$(R_1SiHNH)_n$— wherein n is a number greater than or equal to 3 and is generally from 3 to 200. Preparation of the foregoing polysilazane by ammonolysis of $R_1SiHCl_2$ is described in detail by S. D. Brower and C. P. Haber, J. Amer. Chem. Soc. 1948, 70, 3,888–91, K. A. Andrianov et al., Dokl, Akad, Nauk SSSR 1967, 176 85 and in British Patent No. 881,178.

The polysilazanes (2) containing moieties of formula (Ib) in which $R_1$ is other than H can be copolymers prepared by coammonolysis of $R_1SiHCl_2$ with at least one other silane chosen from $R'SiCl_3$ and $R''R'''SiCl_2$, in which $R'$, $R''$ and $R'''$, which may be identical or different, denote an organic hydrocarbon radical similar to $R_1$.

The polysilazanes (3) containing moieties of formula (IIb) can be prepared by ammonolysis of $Cl_2R_2SiR_3$ or by coammonolysis of this silane with at least one other silane chosen from the group consisting of $R'SiCl_3$ and $R''R'''SiCl_2$, as defined above, or by ammonolysis of disilanes chlorinated according to well-known methods, such as are described, for example, in the Journal of Polymer Science A 2 3,179 (1964), by Redl, Silazane Polymer, Arpa-19, Advanced Research Projects Agency, October 1965, U.S. Pat. Nos. 3,853,567 and 3,892,583, European Pat. No. 75,826 and French Pat. No. 2,497,812.

Any metal element or metal compound, including metal complexes, which effectively promotes the addition of SiH groups to the $SiR_2$ group can be used as a catalyst. A wide variety of such catalysts, including certain iron, nickel and cobalt carbonyl compounds, are known.

The catalyst is preferably a platinum group metal (platinum, iridium, rhodium, ruthenium, osmium and palladium) introduced into the composition in the form of a fine metal powder or preferably in the form of a complex in a measured quantity of 1 to 400 ppm, preferably from 10 to 250 ppm, calculated on the weight of catalyst metal.

Complexes of a platinum group metal can be used as a catalyst, expecially platinum-olefin complexes as described in U.S. Pat. Nos. 3,159,601 and 3,159,662, reaction products of platinum derivatives with alcohols, aldehydes and ethers, described in U.S. Pat. No. 3,220,972, the platinum-vinylsiloxane catalysts described in French Pat. No. 1,313,846 and its addition 88,676 and French Pat. No. 1,480,409, as well as the complexes described in U.S. Pat. Nos. 3,715,334, 3,775,452 and 3,814,730, or a rhodium catalyst such as described in U.S. Pat. Nos. 3,296,291 and 3,928,629. The disclosure of U.S. Pat. Nos. 3,159,601, 3,159,662, 3,220,972, 3,715,334, 3,775,452, 3,814,730, 3,296,291 and 3,928,629 are incorporated herein by reference.

The preferred platinum group metals are platinum and rhodium; the cheaper ruthenium can also be used.

In the polysilazane compositions according to the invention, the molar ratio $SiH/SiR_2$ is generally greater than 0.5 and less than 5 and is preferably from 0.8 to 2.

In the coating, film and thin layer applications, the composition is preferably used without a solvent and the polysilazanes (1), (2) and (3) are chosen so that the viscosity of the composition at 25° C. is from 10 to 5,000 mPa s, preferably from 100 to 1,000 mPa s.

Higher viscosities can be used but, when the intention is to use the compositions to coat or impregnate a substrate, the composition must then be dissolved in an organic solvent which is compatible with polysilazanes, such as benzene, toluene, hexane, cyclohexane, isopropyl ether, ethyl ether, dichloromethane and chlorobenzene.

In fiber applications, viscosities above 5,000 mPa s must be used. Operations can be carried out without a solvent in the molten state or in a solution, the crosslinking taking place after exit from the die by a passage through an oven and/or under irradiation (UV, electron beams).

The polysilazane compositions according to the invention can additionally contain fillers selected from the group consisting of $SiO_2$, $Si_3N_4$, SiC, BN, $B_2O_3$, $B_4C$, AlN, $Al_2O_3$, $Al_4C_3$, TiN, $TiO_2$, TiC, $ZrO_2$, ZrC, $VO_2$, and the like.

The polysilazane composition according to the invention can also be used as a matrix for ceramic fibers made of SiC, $SiO_2$, $Si_3N_4$, $B_4C$, and the like.

The polysilazane composition according to the invention is especially useful, for coating or impregnating rigid or flexible substrates made of metal or of ceramic fibers. Some compositions useful for coating or impregnating these substrates can crosslink at ambient temperature.

In general, however, to crosslink the polysilazane compositions according to the invention, it is preferable to subject the compositions to a thermal treatment, preferably in vacuo or under presssure or in an inert atmosphere from about 50° to 300° C., preferably from about 100° to 200° C. for a period from 1 minute to 24 hours. This crosslinking can be accelerated by the use of irradiation with UV or an electron beam.

However, the polysilazanes can be crosslinked in ambient atmosphere, and the crosslinked materials obtained can also be stored in the ambient atmosphere. It has been possible to demonstrate, in fact, that these crosslinked materials have a wholly unexpected resistance to degradation reactions produced by oxygen and atmospheric moisture.

To accelerate the crosslinking of the composition, it is also possible to add to the composition a free radical initiator, preferably containing no oxygen, at a concentration from 0.01 to 20 parts per 100 parts of composition.

Azobisisobutyronitrile having the following formula is particularly suitable for this purpose:

CN(CH$_3$)$_2$C—N=N—C(CH$_3$)$_2$CN

The substrates covered or impregnated with the cured composition, or the fibers, can be immediately or subsequently subjected to a pyrolysis treatment, preferably in a vacuum, under pressure or in an inert atmosphere, with a temperature rise ranging from the crosslinking temperature to 1,500°–2,000° C., depending on the nature of the ceramic or binder required.

The compositions of the present invention and the process for crosslinking this composition make it possible to produce intermediate semifinished products which can be stored in ambient air and which can be subsequently pyrolysed. Producing semifinished products which can be stored in ambient conditions is a particularly advantageous process for depositing or impregnating a ceramic material into a substrate, and for obtaining ceramic fibers and sintering binders.

In the following examples, which illustrate the invention without restricting its scope, the polysilazanes obtained, whether treated catalytically or not, are analysed by thermogravimetric analysis (TGA) while being pyrolysed from ambient temperature (20° C.) to 1,400° C. under nitrogen at a rate of temperature rise of 2° C./min. The TGA yield (% by weight of solid residue at 1,300°–1,500° C.) is indicated in the examples.

Figure 2:
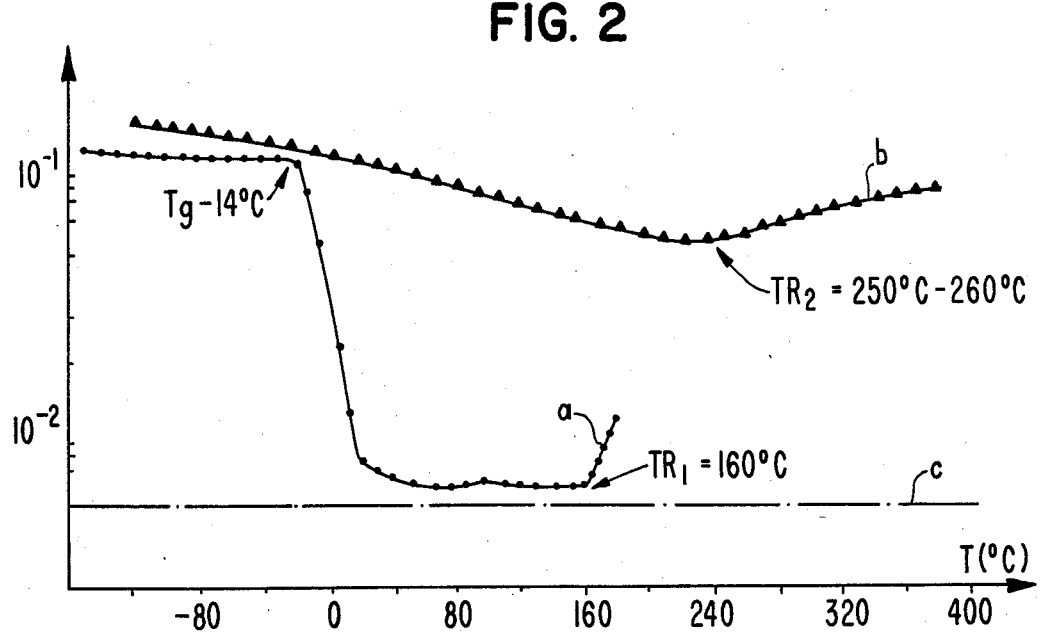

The mechanical properties of the crosslinked compositions are assessed from the variation in the relative rigidity RR as a function of temperature. This variation is illustrated by FIGS. 1 and 2 of the attached drawing and is established using the fiber torsional pendulum method.

Viscosity is measured at 25° C. and is given in mPa s. In addition, in the formula Me=CH$_3$, Vi=CH$_2$=CH, the ammonolysis and coammonolysis reactions are carried out in a first, 3-liter, cylindrical reactor I (equipped with a jacket for cooling the reaction space).

A gas condensor is mounted above the reactor. Mechanical stirring is provided by two Rushton ® turbines (one turbine with straight blades, one turbine with inclined blades) which are arranged along the stirrer shaft.

N$_2$ and NH$_3$ gases are introduced by means of a narrow tube immersed in the solution so that NH$_3$ is produced just below the first turbine stirrer. When ammonolysis is complete the reaction mixture is drained off and is introduced into a second reactor II equipped with mechanical stirring (Rushton ® turbine with straight blades) and a filter bed (mean porosity 10 microns).

The ammonolysates are filtered and the solvent washes are introduced into a third, 6-liter reactor III equipped with a jacket and mechanical stirring, by means of a straight-bladed Rushton ® turbine, and is blanketed with N$_2$ or evacuated to 25 mbar. On leaving the reactor III the solution containing the ammonolysate is introduced into a rotary evaporator.

The whole unit is filled with an inert atmosphere several hours before handling. The entire reaction, ammonolysis, filtration, and solvent evaporation takes place under dry nitrogen. The products obtained are placed in leakproof casks blanketed with nitrogen and are stored, weighed and handled in a nitrogen-blanketed glove box.

Chemical determination of the SiH groups is performed by reaction with 5% by weight of potassium hydroxide in butanol. A quantity of hydrogen which is measured by gasometry and is proportional to the quantity of SiH present in the specimen is released.

In comparison, a specimen of D$_3$N (hexamethylcyclotrisilazane) which contains no SiH moiety, does not give rise to any evolution of hydrogen within the time and temperature range required for the measurement (20° C. for 15 minutes). This proves that potassium hydroxide does not react with the hydrogens bonded to nitrogen. The results of the chemical method, which is simple to use, are consistent with the results of semi-quantitative spectroscopic methods ($^1$H NMR, $^{29}$Si NMR and IR).

In addition, the nomenclature used in the following examples is:

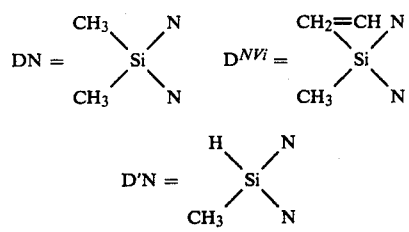

Unless stated otherwise, the percentages shown in the following are by weight.

EXAMPLE 1

207.5 g of CH$_3$HSiCl$_2$ (1.8 mole) of 99% purity are placed in the reactor I in the presence of 1.2 liters of isopropyl ether. Ammonia is introduced into the reactor I at a rate of 6 cm$^3$/s, together with N$_2$ at a rate of 3 cm$^3$/s for 7 h 30 (i.e. approximately 7 moles of NH$_3$ are introduced). The temperature of the reactor I is maintained at 2° C. during the addition of NH$_3$ (6 hours) and is raised to 20° C., with NH$_3$ still being added for 1 h 30. The ammonium chloride removed is dried under vacuum and weighed (188 g, compared with a theoretical weight of 192.6 g).

After removal of the solvent under vacuum (25 mbar at 60° C., followed by 1.5 mbar at 60° C. for 1 hour), 84 g of a clear, low-viscosity liquid are recovered. The weight yield of the reaction is 79%.

The solvents recovered are analysed by gas phase chromatography to identify and quantify the proportion of volatiles removed during the devolatilisation of the product.

The product itself is analysed by IR, $^{29}$Si NMR and $^1$H proton NMR at 360 MHz. C$_6$D$_6$: $\delta=0.1$–0.4 ppm (broad: SiCH$_3$), $\delta=0.6$ to 1.5 ppm (broad: NH), $\delta=4.1$ ppm (broad: SiH), $\delta=4.5$–4.7 ppm (broad: SiH), $\delta=4.8$–5.0 ppm (broad: SiH). Liquid chromatography analysis indicates the presence of several low molecular weight products estimated at between 300 and 450 g/mole.

Quantitative chemical analysis of the product indicates a hydrogen content in the product=1.66% (theory 1.70%). This result is consistent with the results given by spectroscopic methods.

EXAMPLE 2

203 g of MeViSiCl$_2$ (1.44 mole) of greater than 99% purity, in 1.3 liters of isopropyl ether are ammonolysed using the process described in Example 1. The NH$_3$ flow rate is 6 cm$^3$/s, the reaction takes 6 h 30 at 2° C. (i.e. 6.1 moles of NH$_3$ committed). 119 g of silazane are recovered as a clear oil with a viscosity of 3 mPa s. The weight reaction yield is 97%.

The product is analysed by IR, proton NMR, $^{29}$Si NMR and gas phase chromatography. It consists chiefly of two cyclic products.

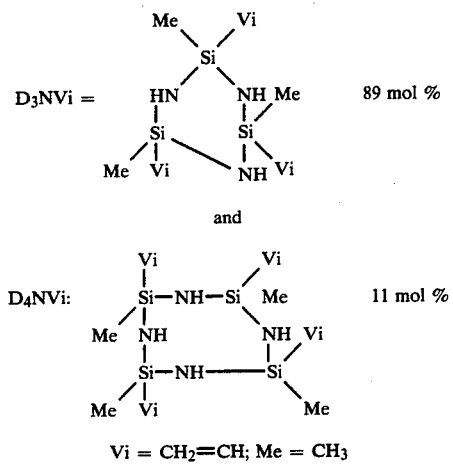

Vi = CH$_2$=CH; Me = CH$_3$

EXAMPLE 3

The coammonolysis in accordance with the process of Example 1 is performed with:
107.2 g of CH$_3$SiCl$_3$ (0.72 mole)
46.25 g of (CH$_3$)$_2$SiCl$_2$ (0.36 mole)
41.4 g of CH$_3$HSiCl$_2$ (0.36 mole) in a solvent medium of isopropyl ether (1.3 liters). The reaction is carried out at 2° C. with an NH$_3$ flow rate of 6 cm$^3$/s for 7 hours (i.e. 6.6 moles of NH$_3$ committed).

81.3 g of a viscous liquid with a viscosity of 1,100 mPa s are recovered. The weight yield of the coammonolysis is 86.2%.

Chemical analysis of the SiH groups=0.37% (theory 0.38%),

EXAMPLE 4

Coammonolysis in accordance with the process of Example 1 is carried out with:
107.2 g of CH$_3$SiCl$_3$ (0.72 mole)
46.25 g of (CH$_3$)$_2$SiCl$_2$ (0.36 mole)
50.76 g of CH$_3$(CH$_2$=CH)SiCl$_2$ (0.36 mole).

The operation is performed in the presence of 1.3 liters of isopropyl ether. The reaction takes place at 2° C. at a NH$_3$ flow rate=6 cm$^3$/s for 6 h 45. 98.7 g of a viscous oil with a viscosity of 110 mPa s are recovered, i.e. a coammonolysis weight yield of 95%.

The product is identified by $^{29}$Si NMR, proton NMR and IR. Its composition corresponds well to that of the materials used T$^N$/D$^N$=1 and D$^{NVi}$/D$^N$=1.

EXAMPLE 5

The coammonolysis is carried out in accordance with the process of Example 1, using:
96.9 g of CH$_3$SiCl$_3$ (0.65 mole)
46.5 g of (CH$_3$)$_2$SiCl$_2$ (0.36 mole)
20.3 g of CH$_3$(CH$_2$=CH)SiCl$_2$ (0.144 mole)
33.1 g of CH$_3$HSiCl$_2$ (0.288 mole)

The reaction is conducted at 3° C. in 1.2 liters of isopropyl ether. The NH$_3$ flow rate is 6 cm$^3$/s and the introduction of ammonia lasts for 7 hours. 88.2 g of a viscous product with a viscosity of 150 mpa s are recovered, i.e. a weight yield of 90%. Chemical determination of the SiH groups: 0.288% (theory 0.294%).

EXAMPLES 6 TO 10

In these examples, a mixture of polysilazanes is used, consisting of 1.325 g of the ammonolysate of CH$_3$HSiCl$_2$ prepared in Example 1 and 4.325 g of the coammonolysate of CH$_3$SiCl$_3$, (CH$_3$)$_2$SiCl$_2$ and (CH$_3$)CH$_2$=CHSiCl$_2$ (in a molar ratio of 0.50-0.25-0.25), prepared in Example 4, corresponding to a SiVi ratio=1.46.

The low-viscosity (100 Mpa s) mixture of ammonolysates and the catalyst are introduced into a reactor capable of withstanding a pressure of 10 bars, which is closed hermetically and then heated in an oven to the required temperature. The results obtained are shown in Table 1 below.

TABLE I

| Example | Catalyst | Metal content, ppm | T in °C. | Time, hours | Appearance at 20° C. | TGA % |
|---|---|---|---|---|---|---|
| 6 | RhCL(Po$_3$)$_3$* | 100 | 170 | 24 | solid | 84 |
| 7 | Pt°** | 100 | 170 | 24 | solid | 86.5 |
| 8 | Pt°** | 100 | 170 | 15 | resin | 73.5 |
| 9 | Pt°** | 100 | 170 | 6 | resin | 69 |
| 10 | Pt°** | 100 | 190 | 6 | resin | 75 |

*φ = C$_6$H$_5$
**complex of Pt° and 1,3-divinyltetramethyldisiloxane, as prepared in Example 1 of U.S. Pat. No. 3,775,452.
the ammonolysate 1 of CH$_3$HSiCl$_2$, prepared in Example 1
the ammonolysate 2 of CH$_3$(CH$_2$=CH)SiCl$_2$ prepared in Example 2
the coammonolysate 3 of CH$_3$SiCl$_3$(CH$_3$)$_2$SiCl$_2$ and CH$_3$HSiCl$_2$, prepared in Example 3
the coammonolysate 4 of CH$_3$SiCl$_3$, (CH$_3$)$_2$SiCl$_2$ and CH$_3$(CH$_2$=CH)SiCl$_2$, prepared in Example 4, using quantities modified to produce the desired SiH/SiCH=CH$_2$ ratio.

The results are collated in the Table II below:

TABLE II

| Ex. | Mixture Composition | SiH/SiCH—CH$_2$ | Catalyst | Metal Content, ppm | T °C. | Time, h | Appearance at 20° C. | TGA % |
|---|---|---|---|---|---|---|---|---|
| 11 | 1 + 2 | 1.46 | Pt°** | 100 | 170 | 20 | solid | 85 |

TABLE II-continued

| Ex. | Mixture Composition | SiH/SiCH—CH$_2$ | Catalyst | Metal Content, ppm | T °C. | Time, h | Appearance at 20° C. | TGA % |
|---|---|---|---|---|---|---|---|---|
| 12 | 2 + 3 | 1.46 | Pt°** | 100 | 170 | 20 | solid | 86 |
| 13 | 3 + 4 | 1.50 | Pt°** | 100 | 170 | 20 | solid | 86 |
| 13a | 3 + 4 | 1.50 | PdCl$_2$COD*** | 100 | 170 | 24 | viscous liquid | 56 |
| 13b | 3 + 4 | 1.50 | Ru(OAC)$_2$(Pφ$_4$)$_2$* | 100 | 170 | 24 | solid | 64 |
| 13c | 3 + 4 | 1.50 | (RhClCOD)$_2$*** | 100 | 170 | 24 | solid | 72 |

φ*C$_6$H$_5$
Pt°**see Table I
COD***1,5-cyclooctadiene

EXAMPLE 14 AND COMPARATIVE EXAMPLES 14a AND 14b

The coammonolysate of CH$_3$SiCl$_3$, (CH$_3$)$_2$SiCl$_2$, CH$_3$HSiCl$_2$ and CH$_3$(CH$_2$=CH)SiCl$_2$ (in molar proportions of 0.45-0.25-0.20-0.10 respectively), prepared in Example 5, is used by itself, which makes it possible to simplify the handling necessary to produce the crosslinking. Given that the same product contains the SiH and SiCH=CH$_2$ groups, only the catalyst needs then to be added.

In the comparative Example 14a the TGA of the initial product has been measured and in the Comparative Example 14b the same operations as in Example 14 are carried out except that no catalyst is added.

The results are collated in Table III below.

TABLE III

| Example | Catalyst | Metal content, ppm | T in °C. | Time in hours | Appearance at 20° C. | TGA % |
|---|---|---|---|---|---|---|
| 14 | Pt°** | 100 | 170 | 20 | solid | 80 |
| 14a | | | | | liquid | 34 |
| 14b | 0 | 0 | 170 | 20 | resin | 53 |

Pt°** see Table I

EXAMPLE 15

In this example, the mixture used is of two coammonolysates of Example 3, containing ≡Si—H moieties (0.37% of H by weight) and of Example 4, containing ≡SI—CH=CH$_2$ moieties (one CH=CH$_2$ per 4 silicons).

The products of Examples 3 and 4 are dissolved at a concentration of 20% by weight in toluene. The solution of Example 4 contains the Pt°** catalyst in an amount calculated so that, after 0.6 g of solution of the product of Example 3 and 0.4 g of solution of the product of Example 4 are mixed, the Pt° content should be 100 ppm, related to the total of the silazane species present, and the SiH/SiVi ratio in this mixture is equal to 1.46. After the two solutions have been mixed cold, a hank of glass fibers is impregnated to assess the mechanical properties obtained in the crosslinked material.

I—Analysis of mechanical properties

A fiber torsion pendulum is used for this purpose.

Principle of the measurement: a hank of glass fibers (approximately 3,000 fibers) is impregnated with the solution of polysilazanes as prepared above, to which the catalyst has been added. After evaporation and drying of the compound under vacuum (T less than 50° C.) the period and the amplitude of the swings of the pendulum is measured as a function of temperature or time according to the method described by B. Hartman and G. F. Lee, Journal of Applied Polymer Science, 21 (1977) p. 1,341.

The period p is related to the relative rigidity (RR) of the specimen (RR=1), itself proportional to the elasticity modulus G'=8pi L I. RR (L, r and I being the length, the radius and the moment of inertia of the specimen).

The amplitude of the swings gives the damping curve and the variation of the loss modulus (delta) as a function of temperature:

$$\text{delta} = \frac{1}{n} \log \frac{Ar}{A_{r+n}}$$

Ar=amplitude of the reference peak and $A_{r+n}$=amplitude of the peak after n cycles.

The analysis comprises the following three successive stages once the fiber has been impregnated with the mixture of polysilazanes containing the catalyst and dried under vacuum.

1. First temperature rise from −160° to 180° C. (subsequent crosslinking temperature) with a delta t of approximately 1.5° C./min. (a).
2. Crosslinking of the resin isothermally at 180° C. for 12 h.
3. Slow cooling to −160° C. and a second temperature rise up to 400° C. with delta t of 1.5° C./min. (b).

FIG. 1 of the attached drawing shows the variation of the relative rigidity RR of the specimen, during the first run, curve (a), and during the second run, curve (b). Curve (c) is the curve obtained with the fibers by themselves without polysilazanes.

A clear T$_g$ (glass transition temperature of the product) is recorded during the first run at −8° C. This demonstrates the existence of an intimate mixture of the two polysilazanes. The fiber becomes more rigid from TR$_1$=160° C. upwards, clearly indicating the onset of crosslinking between the species SiH and the species SiVi.

The product is crosslinked for 12 h at 180° C. Table IV gives the values of RR=relative rigidity of the composite minus the relative rigidity of the uncovered fibers, as a function of crosslinking time at a temperature of 180° C.

After crosslinking, the curve (b) in FIG. 1 clearly shows the increase in rigidity of the composite over a wide range of temperature. It can also be seen that a second crosslinking appears at TR$_2$=260° C. This second crosslinking is due to a redistribution of the Si—NH bonds in the system, which is accompanied by an evolution of NH$_3$ and is characteristic of the thermal crosslinking of any polysilazane.

TABLE IV

| Time in min | 0(1) | 0(2) | 10 | 60 | 100 | 140 | 180 | 220 | 300 | 400 | 500 | 600 | 700 |
|---|---|---|---|---|---|---|---|---|---|---|---|---|---|
| delta RR × 10² | 0.3 | 0.8 | 1.1 | 1.7 | 2.1 | 2.45 | 2.8 | 3.15 | 3.6 | 3.9 | 4.2 | 4.45 | 4.7 |

0(1) = delta RR at 160° C. before crosslinking
0(2) = delta RR at 180° C. after a dynamic rise from 160 to 180° C. (approximately 15 min.)

EXAMPLE 16 AND COMPARATIVE EXAMPLE 16a

The mixture used in this example is of two coammonolysates: that of Example 3, containing SiH moieties (0.37% of H by weight) and that of Example 2, containing SiCH CH₂ moieties (one CH=CH₂ per silicon) so that the SiH/SiVi ratio=1.47.

Example 16 is performed in the same manner as Example 15. Comparative Example 16a is performed in the same manner as Example 15, except that no platinum is added.

FIG. 2 in the attached drawing shows the fiber torsion pendulum analysis of Example 16. The results of Example 16 are wholly similar to those of Example 15. Table V shown the kinetics of formation of the mechanical properties in the crosslinked material in Examples 16 and 16a.

TABLE V

| Ex. | Time | 0(1) | 0(2) | 10 | 60 | 100 | 140 | 180 | 220 | 300 | 400 | 500 | 600 | 700 | 1200 |
|---|---|---|---|---|---|---|---|---|---|---|---|---|---|---|---|
| 16 | delta RR × 10² | 0.1 | 0.65 | 1.05 | 1.9 | 2.5 | 3.0 | 3.4 | 3.8 | 4.2 | 4.8 | 5.2 | 5.5 | 5.8 | — |
| 16a | delta RR × 10² | 0.15 | 0.2 | 0.35 | 1.05 | 1.6 | 2.0 | 2.35 | 2.65 | 3.1 | 3.6 | 3.8 | 4.0 | 4.2 | 4.8 |

0(1) = delta RR at 160° C. before crosslinking
0(2) = delta RR at 180° C. after a dynamic rise from 160 to 180° C. (approximately 15 min.)

EXAMPLE 17

Crosslinking of the mixture of ammonolysates of Examples 6 to 10 is carried out.

This crosslinking is very greatly accelerated by the addition of azobisisobutyronitrile (AIBN) to the platinum-based catalyst system. The results are collated in Table VI below.

TABLE VI

| Example | Catalyst | Catalyst concentration | T in °C. | Time h | Appearance at 20° C. | TGA % |
|---|---|---|---|---|---|---|
| 9 | Pt°** | 100 ppm of Pt | 170 | 6 | very viscous liquid | 69 |
| 17 | Pt°** + AIBN | 100 ppm of Pt 164 g kg⁻¹a | 170 | ½ | resin | 77 |

EXAMPLE 18

The same polysilazanes as in Examples 6 to 10 are used, except that AIBN is added after 6 hours reaction with platinum.

The results are collated in Table VII below;

TABLE VII

| Example | Catalyst | Catalyst concentration | T in °C. | Time h | Appearance at 20° C. | TGA % |
|---|---|---|---|---|---|---|
| 9 | Pt°** | 100 ppm of Pt | 170 | 6 | viscous liquid | 69 |
| 18 | Pt°** + AIBN | 100 ppm of Pt 164 g kg⁻¹a | 170 | 6 + 1/12 | solid | 75 |

Pt°**: see Table I

EXAMPLE 19

In this example, the ammonolysate 1 of Example 1 is mixed in air with the coammonolysate 4 of Example 4, in a quantity such as to give a SIH/SiCH=CH₂ ratio of 1.5. 100 ppm (metal) of the Pt° platinum catalyst which is identical to that mentioned in Table VII above are added. The crosslinking is carried out for 24 h at 170° C. in open air. A solid is obtained, the pyrolysis of which indicates a TGA yield of 82%.

What is claimed is:

1. A crosslinkable polysilazane composition comprising:
   (a) at least one polysilazane (1) containing at least 2 ≡SiH groups per molecule and at least 2 SiR₂ groups per molecule, wherein R₂ is an unsaturated hydrocarbon; and
   (b) a catalytically effective quantity of a metal element or a metal compound to catalyze a hydrosilylation reaction SiH/SiR₂.

2. A composition according to claim 1 wherein said polysilazane (1) comprises at least 3 ≡SiH groups per molecule.

3. A composition according to claim 1, wherein the polysilazane (1) contains
   (a) at least 2 moieties per molecule selected from the group consisting of the moieties of formulae:

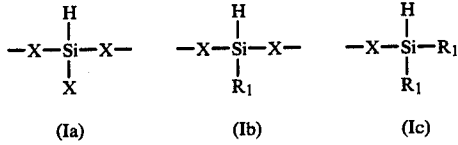

(Ia)        (Ib)        (Ic)

in which R₁, which in (Ic) may be identical or different, is selected from the group consisting of hydrogen, saturated hydrocarbons, aryl, alkylaryl and arylalkyl, X, which may be identical or different in formulae (Ia) and (Ib), denotes the chain links (CH₂)$_n$, wherein n is an integer from 1 to 8, —Si— or N—, at least 50% of the Xs being N—; and (b) at least 2 moieties chosen from the group consisting of the moieties of formula:

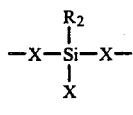 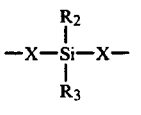 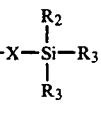

(IIa)  (IIb)  (IIc)

wherein R$_2$ is a hydrocarbon containing alkene or alkyne unsaturation and R$_3$, which in formula (IIc) may be identical or different, is the same as R$_1$ or R$_2$ except R$_3$ is not hydrogen, and X has the meaning given above.

4. A composition according to claim 3, further comprising:
   (a) at least one polysilazane (2) contaning, per molecule, at least 2 moieties selected from the group consisting of the moieties of formulae (Ia), (Ib) and (Ic); and
   (b) at least one polysilazane (3) containing, per molecule, at least 2 moieties selected from the group consisting of the moieties of formula (IIa), (IIb) and (IIc).

5. A composition according to claim 4, wherein said polysilazane (2) contains, per molecule, at least 3 moieties selected from the group consisting of the moieties of formulae (Ia), (Ib) and (Ic).

6. A crosslinkable composition comprising:
   (a) at least one polysilazane (2) containing, per molecule, at least 2 moieties selected from the group consisting of the moieties of formulae (Ia), (Ib) and (Ic)

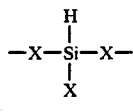 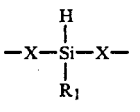 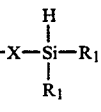

(Ia)  (Ib)  (Ic)

in which R$_1$, which in (Ic) may be identical or different, is selected from the group consisting of hydrogen, a saturated hydrocarbon, aryl, alkylaryl and arylalkyl and X, which may be identical or different in formulae (Ia) and (Ib), denotes the chain links (CH$_2$)$_n$, wherein n is an interger from 1 to 8, —Si— or N—, with at least 50% of the Xs being N;

(b) at least ont polysilazane (3) containing, per molecule, at least 2 moieties selected from the group consisting of the moieties of formula (IIa), (IIb) and (IIc):

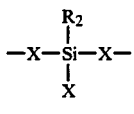 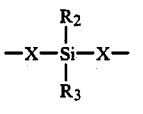 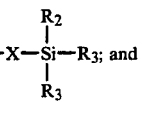

(IIa)  (IIb)  (IIc)

in which R$_2$ denotes a hydrocarbon containing alkene or alkyne unsaturation, R$_3$, which in (IIc) may be identical or different, is selected from the group consisting of saturated hydrocarbon, aryl, alkylaryl, arylalkyl and hydrocarbon containing alkene or alkyne unsaturation, and X, which may be identical or different in formulae (IIa) and (IIb), denotes the chain links (CH$_2$)$_n$, wherein n is an integer from 1 to 8, —Si— or —N— with at least 50% of the Xs being N; and (c) a catalytically effective quantity of a metal element or a metal compound to catalyze a hydrosilylation reaction SiH/SiR$_2$.

7. A composition according to claim 6 wherein R$_1$ is selected from the group consisting of hydrogen, methyl and phenyl, R$_2$ is vinyl and R$_3$ is chosen from the group consisting of methyl and phenyl.

8. A composition according to claim 3, wherein R$_1$ is selected from the group consisting of hydrogen, methyl and phenyl, R$_2$ is vinyl and R$_3$ is chosen from the group consisting of methyl and phenyl.

9. A composition according to claim 4 wherein R$_1$ is chosen from the group consisting of hydrogen, methyl and phenyl, R$_2$ is vinyl and R$_3$ is chosen from the group consisting of methyl and phenyl.

10. A composition according to claim 5 wherein R$_1$ is chosen from the group consisting of hydrogen, methyl and phenyl radicals, R$_2$ is vinyl and R$_3$ is chosen from the group consisting of methyl and phenyl radicals.

11. A composition according to claim 3 and further comprising at least one filler selected from the group consisting of SiO$_2$, Si$_3$N$_4$, SiC, BN, B$_2$O$_3$, B$_4$C, AlN, AL$_2$O$_3$, Al$_4$C$_3$, TiN, TiO$_2$, TiC, ZrO$_2$, ZrC, and VO$_2$.

12. A composition according to claim 6 and further comprising at least one filler selected from the group consisting of SiO$_2$, Si$_3$N$_4$, SiC, BN, B$_2$O$_3$, B$_4$C, AlN, AL$_2$O$_3$, Al$_4$C$_3$, TiN, TiO$_2$, TiC, ZrO$_2$, ZrC, and VO$_2$.

13. A composition according to claim 1 and further comprising at least one filler selected from the group consisting of SiO$_2$, Si$_3$N$_4$, SiC, BN, B$_2$O$_3$, B$_4$C, AlN, AL$_2$O$_3$, Al$_4$C$_3$, TiN, TiO$_2$, TiC, ZrO$_2$, ZrC, and VO$_2$.

14. A composition according to claim 1 wherein said polysilazane has an SiH/SiR$_2$ molar ratio from about 0.5/1 to 5/1.

15. A composition according to claim 14 wherein said polysilazane has an SiH/SiR$_2$ molar ratio from 0.8/1 to 2/1.

16. A composition according to claim 3 wherein no solvent is used, and wherein the polysilazane (1) is selected so that the viscosity of the composition at 25° C. is from 10 to 5,000 mPa s.

17. A composition according to claim 16 wherein said viscosity is from 100 to 1,000 mPa s.

18. A composition according to claim 4, wherein no solvent is used and wherein the polysilazanes (1), (2) and (3) are selected so that the viscosity of the composition at 25° C. is from 10 to 5,000 mpa s.

19. A composition according to claim 16, wherein no solvent is used and wherein the polysilazanes (2) and (3) are selected so that the viscosity of the composition at 25° C. is from 10 to 5,000 mpa s.

20. A composition according to claim 3, which can be used for spinning fibers and is capable of being in the molten state without a solvent or in solution in a solvent, characterized in that the polysilazane (1) is selected so that the viscosity is higher than 5,000 mPa s.

21. A composition according to claim 1, wherein the catalyst content is from 1 to 400 ppm, calculated on the weight of the catalyst metal.

22. A composition according to claim 6, wherein the catalyst content is from 1 to 400 ppm, calculated on the weight of the catalyst metal.

23. A composition according to claim 1, wherein the catalyst metal is a member of the platinum group.

24. A composition according to claim 6, wherein the catalyst metal is a member of the platinum group.

25. A composition according to claim 1, wherein said composition additionally contains a free-radical generator.

26. A composition according to claim 6, wherein said composition additionally contains a free-radical generator.

27. A composition according to claim 26, wherein the free-radical generator is azobisisobutyronitrile.

28. A composition according to claim 25, wherein the free-radical generator is azobisisobutyronitrile.

29. A process for crosslinking the composition of claim 1, comprising the step of heating said composition under vacuum or under pressure or in an inert atmosphere or in ambient atmosphere to a temperature from 50° to 300° C.

30. A process for crosslinking the compounds of claim 33, comprising the step of heating said composition under vacuum or under pressure or in an inert atmosphere or in ambient atmosphere to a temperature from 50° to 300° C.

31. A process for covering or impregnating a substrate with a ceramic material, comprising the steps of:
 (a) coating or impregnating a substrate with a composition according to claim 1;
 (b) crosslinking said composition; and
 (c) pyrolyzing said coating or said impregnated composition by a thermal treatment ranging from the crosslinking temperature to 1,500°–2,000° C.

32. A process for covering or impregnating a substrate with a ceramic material, comprising the steps of:
 (a) coating or impregnating a substrate with a composition according to claim 6;
 (b) crosslinking said composition; and
 (c) pyrolyzing said coating or said impregnated composition by a thermal treatment ranging from the crosslinking temperature to 1,500°–2,000° C.

* * * * *